S. B. SEATON & R. G. TRAVIS.
TAG MAKING MACHINE.
APPLICATION FILED AUG. 20, 1908.
981,014.
Patented Jan. 10, 1911.
7 SHEETS—SHEET 4.
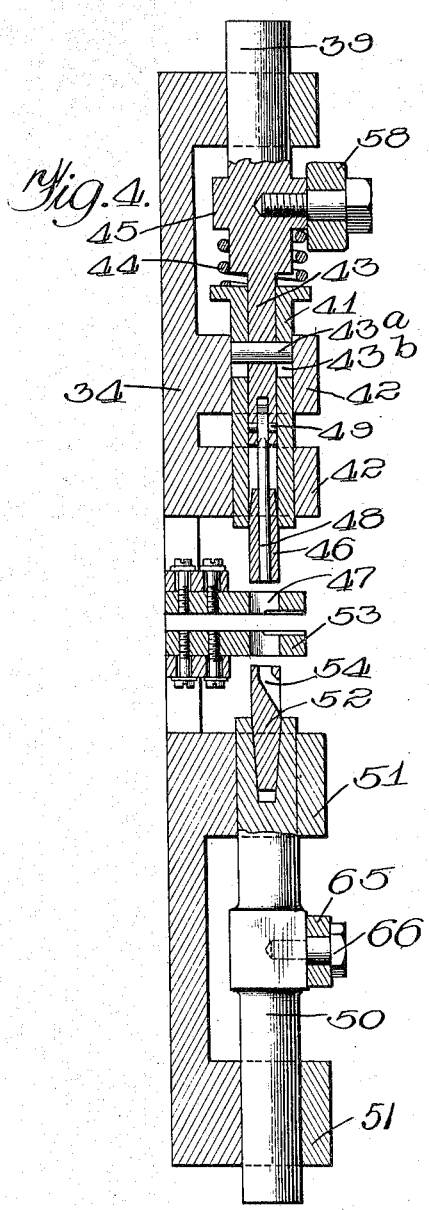
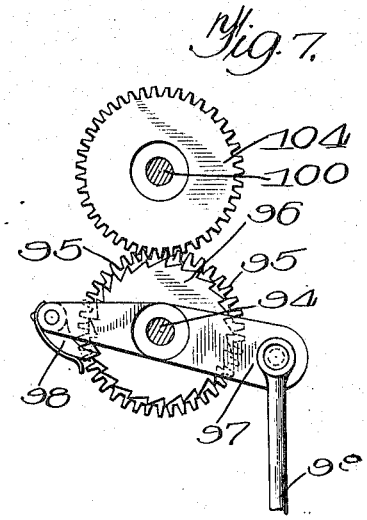
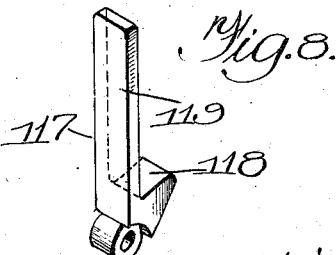
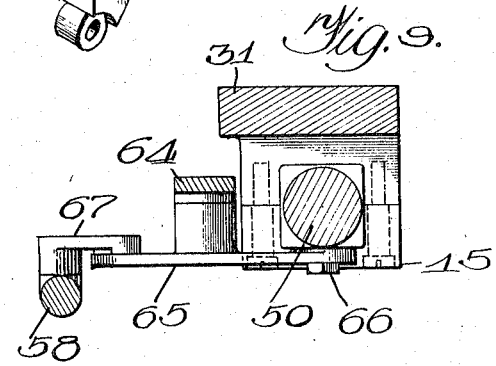

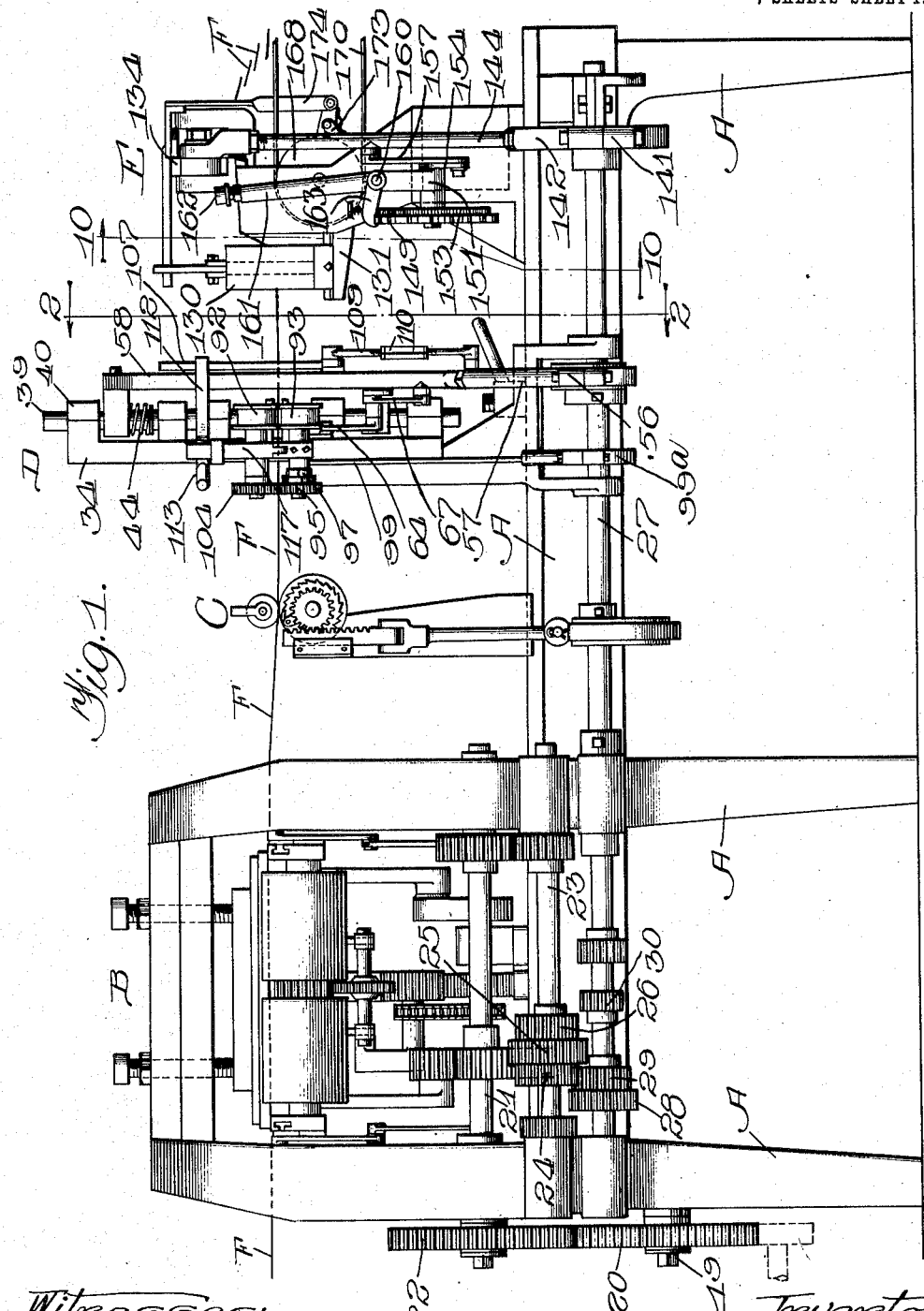

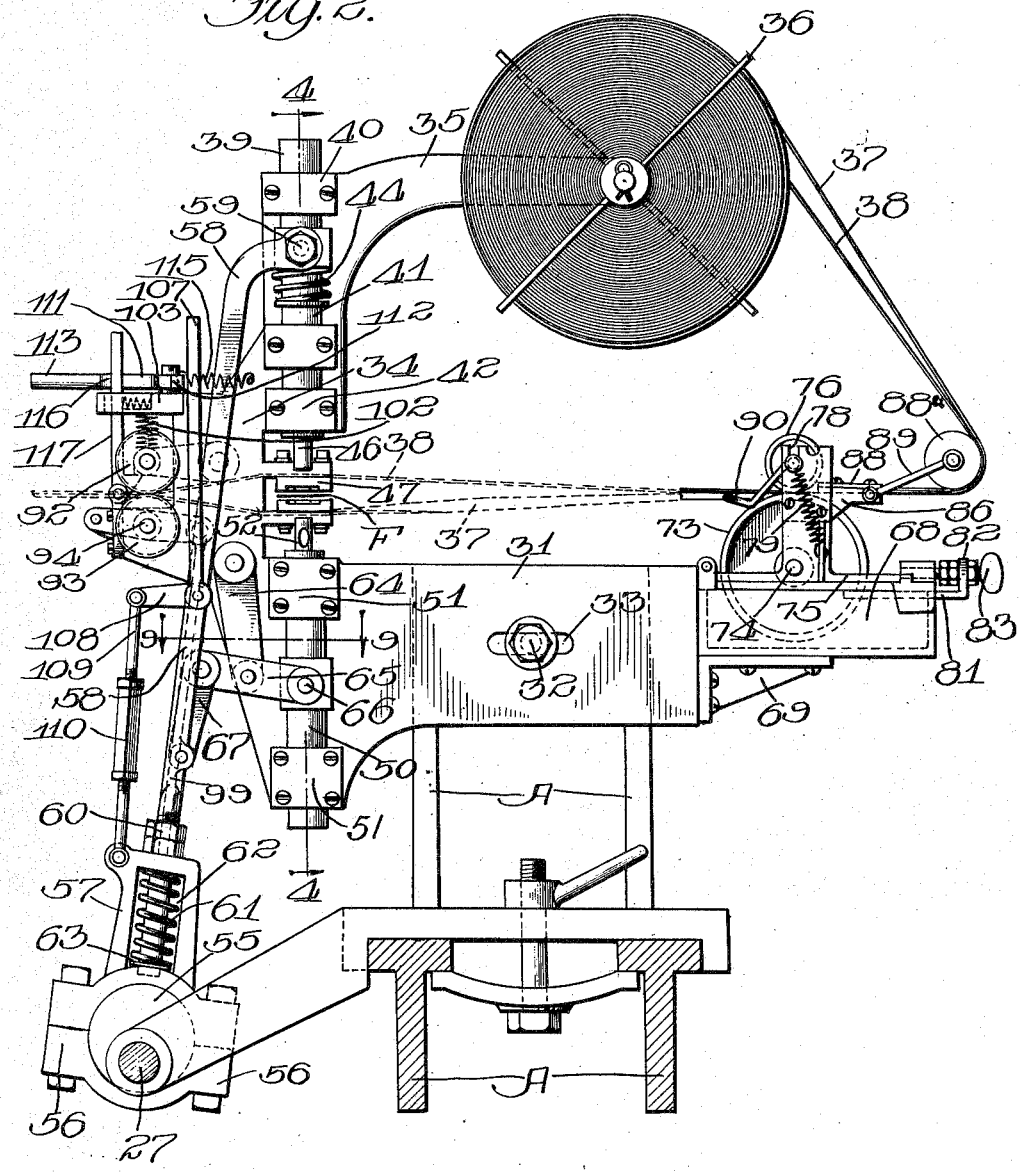

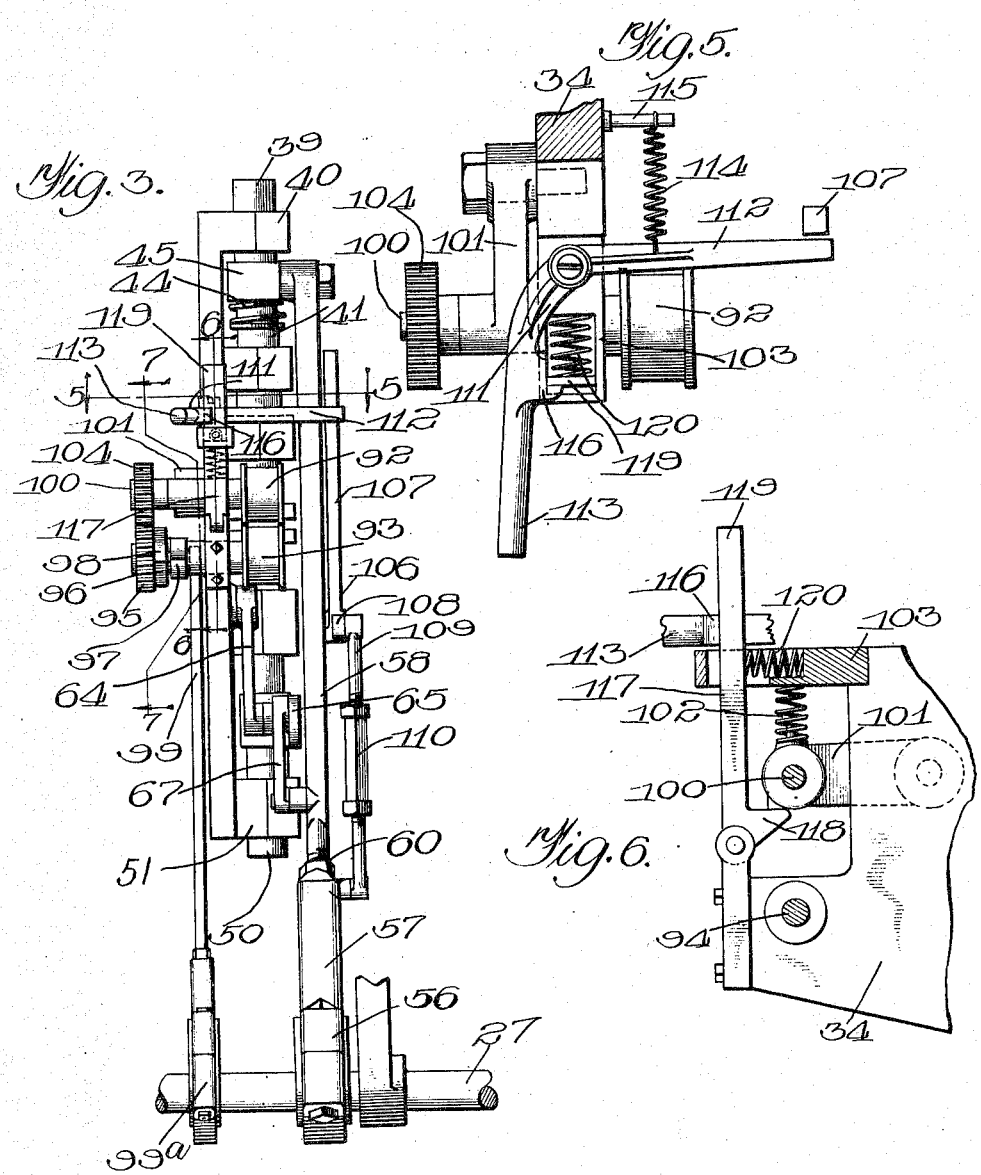

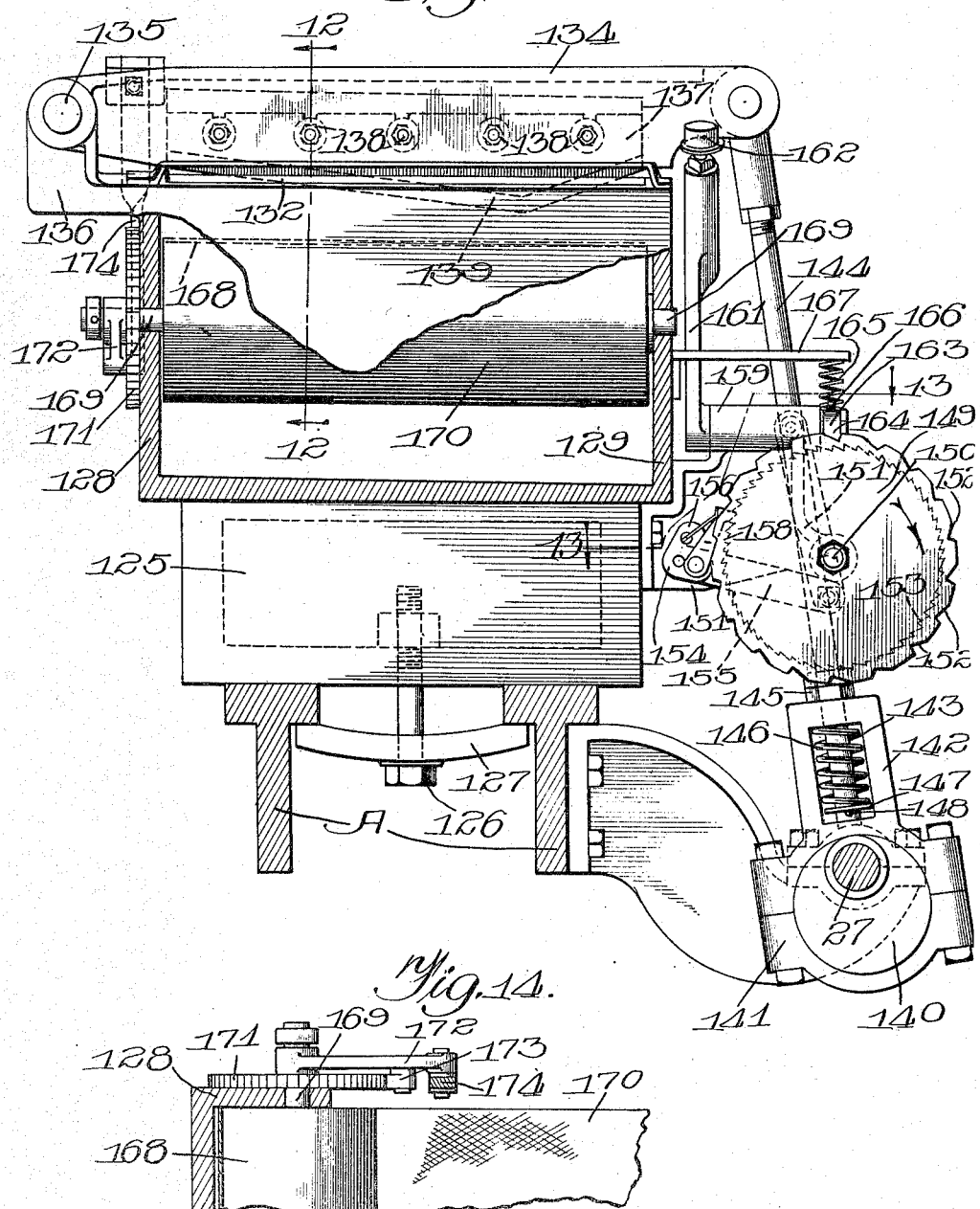

S. B. SEATON & R. G. TRAVIS.
TAG MAKING MACHINE.
APPLICATION FILED AUG. 20, 1908.
981,014.
Patented Jan. 10, 1911.
7 SHEETS—SHEET 6.
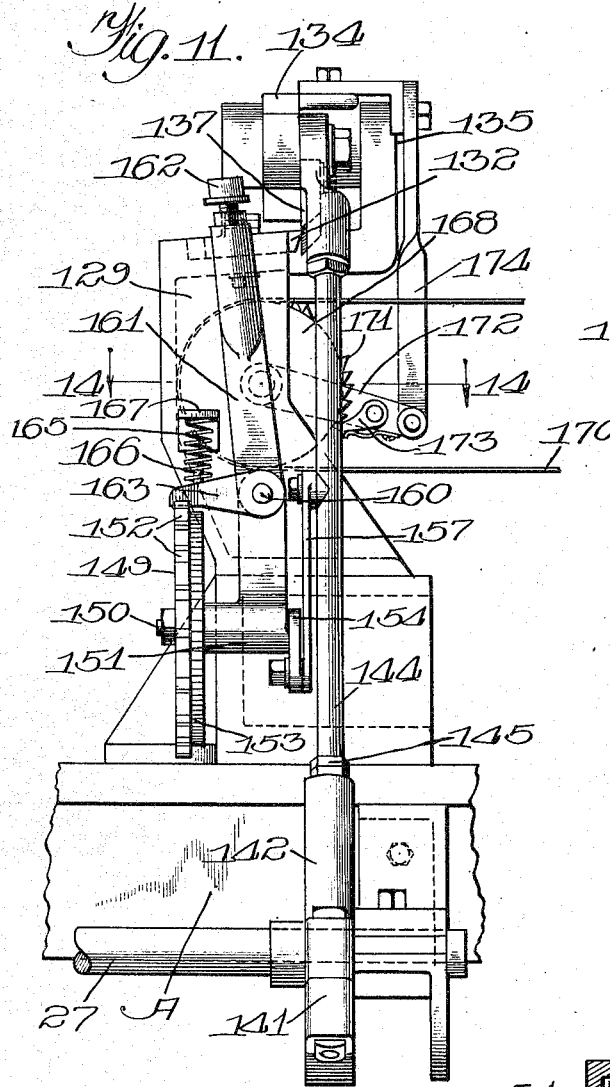
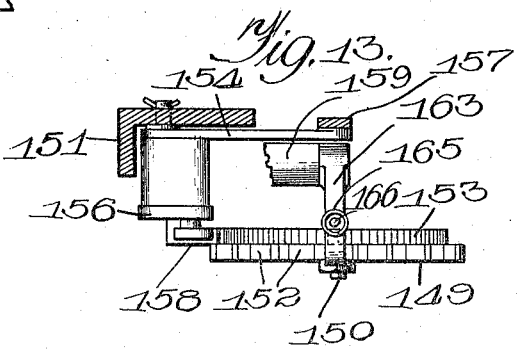

S. B. SEATON & R. G. TRAVIS.
TAG MAKING MACHINE.
APPLICATION FILED AUG. 20, 1908.
981,014.
Patented Jan. 10, 1911.
7 SHEETS—SHEET 7.
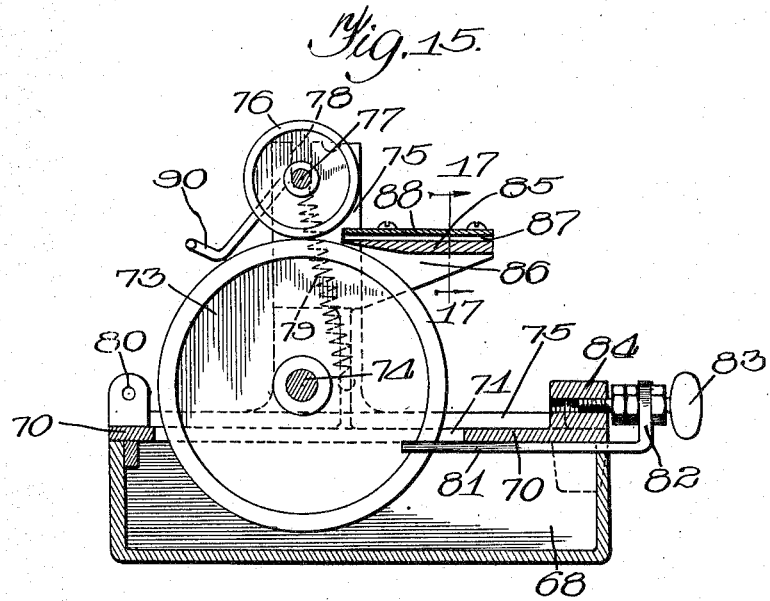
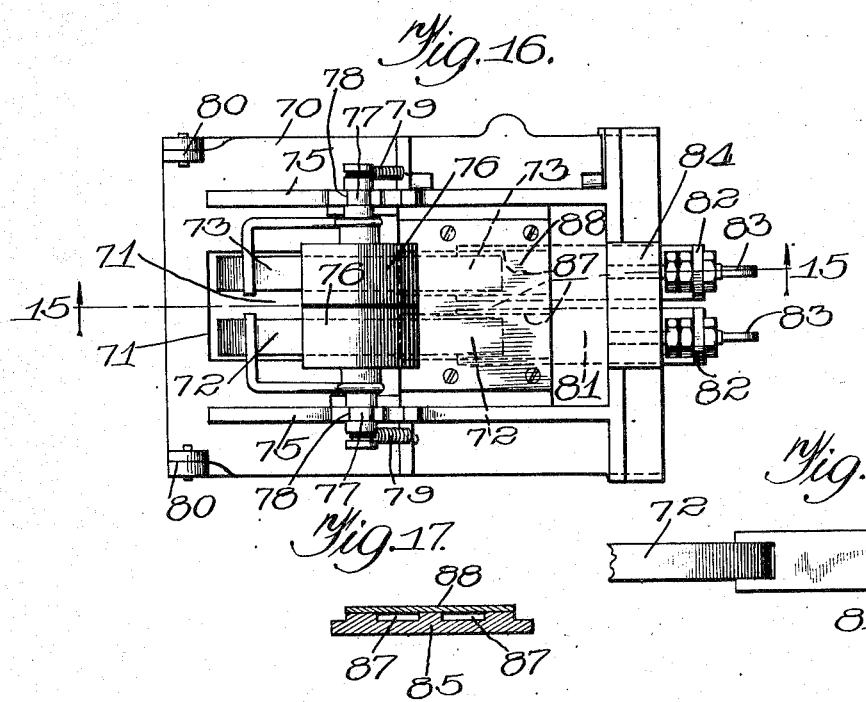

UNITED STATES PATENT OFFICE.

STROWBRIDGE B. SEATON AND ROY G. TRAVIS, OF CHICAGO, ILLINOIS, ASSIGNORS TO INTERNATIONAL TAG COMPANY, OF CHICAGO, ILLINOIS, A CORPORATION OF NEW JERSEY.

TAG-MAKING MACHINE.

981,014.  Specification of Letters Patent.  Patented Jan. 10, 1911.

Application filed August 20, 1908. Serial No. 449,473.

*To all whom it may concern:*

Be it known that we, STROWBRIDGE B. SEATON and ROY G. TRAVIS, citizens of the United States, residing at Chicago, in the county of Cook and State of Illinois, have invented certain new and useful Improvements in Tag-Making Machines, of which the following is a specification, reference being had to the accompanying drawings.

Our invention relates to tag-making machinery, and particularly to that class of tag-making machinery in which the paper to be printed is in the form of a continuous roll which is fed to the machine and which may be printed with suitable matter, forwarded through the machine by the intermittent feeding mechanism whose feed may be varied in accordance with the width of the tag which it is desired to produce, and in which the strip of paper thus fed may have strengthening washers applied to it with openings punched through them for the thread, may have the corners of the tags cut, and the tags then severed either into single tags or in gangs.

It is the object of our invention first to improve the washer-forming and applying mechanism, and to provide mechanism by which the washer-feeding mechanism may be automatically stopped in case the feeding of the web stops in order to prevent clogging of the machine.

It has for a second object the providing of new and improved cutting mechanism by which the tags may be severed either completely across between successive tags or in gangs,—that is to say, having the web completely severed across only after a given number of tags have passed under the cutter and cut partly across between such tags.

It has for a third object to provide a new pasting mechanism for the strips from which the washers are formed.

It has for a fourth object the improving of tag-making machinery in sundry details hereinafter set forth.

In the accompanying drawings:—Figure 1 is a side elevation of a tag-making machine embodying our improvements. Fig. 2 is an end elevation of the washer-applying mechanism, being a section on line 2—2 of Fig. 1. Fig. 3 is an enlarged detail, being a side view of the washer-applying mechanism, with the frame and other parts removed for the sake of clearness of illustration. Fig. 4 is an enlarged detail, being a section on line 4—4 of Fig. 2. Fig. 5 is an enlarged detail, being a section on line 5—5 of Fig. 3. Fig. 6 is an enlarged detail, being a section on line 6—6 of Fig. 3. Fig. 7 is an enlarged detail, being a section on line 7—7 of Fig. 3. Fig. 8 is an enlarged detail, being an isometric view of the bellcrank-lever that lifts the upper washer-strip feed-roller. Fig. 9 is an enlarged detail, being a section on line 9—9 of Fig. 2. Fig. 10 is an enlarged detail, being a section on line 10—10 of Fig. 1. Fig. 11 is an enlarged detail, being an end view of the cutting mechanism seen from the same side as the corresponding parts are seen from in Fig. 1. Fig. 12 is an enlarged detail, being a section on line 12—12 of Fig. 10. Fig. 13 is an enlarged detail, being a section on line 13—13 of Fig. 10. Fig. 14 is an enlarged detail, being a section on line 14—14 of Fig. 11. Fig. 15 is an enlarged detail, being a section on line 15—15 of Fig. 16. Fig. 16 is an enlarged detail, being a top or plan view of the paste-applying mechanism. Fig. 17 is an enlarged detail, being a section on line 17—17 of Fig. 15. Fig. 18 is an enlarged detail, being a top or plan view of a part of one of the strips for wiping the paste from one of the paste-wheels, and a part of one of the paste-wheels, showing their relation to one another.

Referring to the several figures of the drawings:—A indicates the framework of the machine which carries printing mechanism B, intermittent variable feed mechanism C, washer-forming and applying mechanism D, and corner-punching and cutting mechanism E. The printing press B may be of any well-known and approved form of reciprocatory printing mechanism adapted to print a web of paper F put through the machine from any suitable source in any suitable manner. It is believed that it is therefore unnecessary to describe the printing mechanism here, as it forms no part of our present invention and as we are filing another application of even date herewith to cover the mechanism specifically shown. Moreover, as our present invention deals only with the tag-forming machine proper, and as such tag-forming mechanism may be used wholly independently of any printing-press at all, in case it is desired to produce unprinted tags, it is believed that any description of the printing press mechanism is wholly unnecessary.

19 indicates a stud on the frame A upon which is mounted a gear 20 which is driven from any suitable source of power.

21 indicates a shaft which is journaled in the frame A and has a gear 22 secured to its outer end meshing with the gear 20.

23 indicates a shaft journaled in the frame A and connected by suitable gearing to the shaft 21 and provided upon its surface with gears 24—25—26 of different sizes.

27 indicates a shaft which is journaled in the frame A and extends longitudinally substantially the entire length thereof.

28—29—30 indicate shiftable gears of different sizes mounted on the shaft 27, and adapted to mesh respectively with the gears on the shaft 23, in order that the relative speed between the shaft 23 and the shaft 27 may be varied. It is believed that it is unnecessary to describe this variable gearing here, as it is old and well-known, and, as far as our present invention is concerned, may be of any approved type and method of operation.

The intermittent variable-feed mechanism C is mounted on the frame A, driven by the shaft 27, and may be of any well-known and approved form. It is enough to say that it operates to feed the web of paper intermittently through the printing press and to the other tag-forming mechanisms hereinafter described, and that the amount of the feed at each operation may be varied in any well-known way in accordance with the width of the tag which it is desired to produce. It should also be observed that this intermittent feed mechanism is so geared and adjusted as to be "silent" during the printing and during the washer-applying and cutting operation hereinafter described, and to operate to feed the strip forward through the machine after the impression by the printing press and while the washer-applying and cutting mechanism are not doing their work. As these operations, however, are well-known and as our present invention is not concerned with this intermittent feed mechanism, it is believed that it is unnecessary to describe it fully herein.

The washer-applying and cutting mechanism D is shown in detail in Figs. 2 to 9, inclusive. Referring to those figures, and for the present particularly to Fig. 2, 31 indicates a frame which is mounted upon the frame A and preferably is adjustable laterally thereon by means of bolt 32 and slot 33. The frame 31 is provided with an upright portion 34 which is provided with an arm 35 projecting out over the bed of the machine and adapted to support a reel 36 on which are wound two ribbons of paper 37—38, from which the washers to be applied to the tags are made. 39 indicates a rod which is slidingly mounted in a suitable bracket 40 on the upright portion 34 of the frame 31. 41 (see Fig. 4) indicates a sleeve which is slidingly mounted in brackets 42 on the upright portion 34 of the frame 31. The lower end of the rod 39 is provided with a smaller portion 43 which is adapted to slide within the sleeve 41, this motion being limited by a pin 43ª in the rod 43 whose ends enter slots 43ᵇ in said sleeve 41. 44 indicates a spiral spring interposed between the top of the sleeve 41 and a suitable shoulder, as 45, on the rod 39. 46 indicates a male cutting die which is removably secured in the lower end of the sleeve 41 and coöperates with the female cutting die 47 to cut a washer from one of the strips 37—38. The die 46 is centrally longitudinally perforated to receive a punch 48, the upper end of which is clutched in a suitable slot 49 in the lower end of the portion 43 of the rod 39. 50 indicates a rod which is slidingly mounted in brackets 51 on the frame 31 and carries removably secured to its upper end a male die 52 which is adapted to coöperate with a female die 53 secured to the arm 31 to punch a washer from the other one of the strips 37—38 fed to it as hereinafter described. The upper end of the die 52 is provided with a passage 54 opening from its top and outward from its sides which coöperates with the punch 48 as hereinafter described and forms a passage for the punched-out central portion of the washer.

Referring particularly to Figs. 2 and 3, 55 indicates an eccentric carried upon the shaft 27 and revoluble therewith. 56 indicates the eccentric-box or strap which is provided with an upwardly-projecting bracket 57 preferably formed integral therewith. 58 indicates a rod whose upper end is pivotally connected with the rod 39 above the spring 44 by means of a screw 59, or in any other suitable manner. The lower end of the rod 58 passes through the top of the bracket 57 being prevented from passing too far into said bracket by means of a nut 60. The nut 60 may be adjusted on the shaft so as to vary the position of the lower end of the rod 58 in the bracket 57. 61 indicates a strong spiral spring seated in a suitable recess 62 in the bracket 57 and whose upper end bears against the top of the recess and whose lower end bears against a suitable shoulder, as 63, on the lower end of the rod 58. It will be obvious from the above description that when the eccentric-box 56 is carried downward by the eccentric 55, a yielding downward movement will be given to the rod 58 by the interposition of the spring 61, carrying downward the rod 39 and moving with it the washer-cutting and punching mechanism, as hereinafter described. It is enough to say at this point that the tension of the spring 61 is sufficient to cut and punch the washer strips, but when the opposing parts have come together so that further movement is not permitted, the spring 61 will yield to the further movement of the eccentric-box. Referring still to the same figures, 64 indicates a hanger which is pivotally mounted on the frame 31 and carries pivoted to its lower end a lever 65. The inner arm of the lever 65 is pivotally connected to the rod 50 by a screw 66, or in any other appropriate manner, and the other end is pivotally connected to one end of a link 67, whose other end is pivotally connected to the rod 58. It will be obvious without further description that by the reciprocation of the rod 58, by means of the eccentric, a reciprocating movement is given to the rod 50 in opposite direction to that of the rod 39, so as to cause the washer cutting and punching mechanisms to move toward each other.

68 (see Figs. 2, 15 and 16) indicates a glue-box which is carried by means of suitable brackets 69 on the frame 31. The glue-box is provided with a cover 70 which has an opening 71 therein for the passage of the paste-wheels 72—73 which are mounted upon a shaft 74 in brackets 75 secured to the cover 70. The paste-wheels 72—73 are two in number, one for each strip 37—38, and serve to carry glue from the box 68 to the under surface of the strips. 76 indicates rollers which are mounted upon a shaft 77 journaled in slots 78 in the tops of the brackets 75. The rollers 76 are held against the paste-wheels 72—73 by springs 79, one end of which engages shaft 77 and the other is suitably secured to the top of the glue-box. The top 70 of the glue-box 68 is preferably hinged to the glue-box by hinges 80. 81 indicates strips of metal whose forward ends project over the opening 71 and are recessed to straddle the paste-wheels 72—73. These strips project outward through suitable openings in the end of the glue-box, and, being bent upward at their outer ends, as at 82, at right angles with the rest of the strip, are adjustably mounted in the glue-box so that they may be moved toward and away from the paste-wheels 72—73 by set-screws 83 which enter screw-threaded lugs 84 on the cover, as is best shown in Figs. 15 and 16. By means of the set-screws, the strips may be adjusted closer to or farther away from the peripheries of the paste-wheels in order to regulate the amount of glue or paste supplied by said paste-wheels to the strips.

Referring particularly to Figs. 15 and 17, 85 indicates a plate which is mounted between suitable brackets 86 on the bracket 75 and is provided on its upper surface with two longitudinal grooves 87 adapted to receive the ribbons of paper 37—38. 88 indicates a cover-plate which is secured to the plate 85 to close the slots 87 over their tops so as to properly hold the washer-strips 37—38. 88ª indicates a roller which is mounted upon a frame 89 on the bracket 86. 90 indicates a lifting rod adapted to engage the slips and raise them from the glue wheels when not in operation. The strips of paper 37—38, fed forward by the intermittent feeding device hereinafter described, pass over the rolls 88ª, through the grooves 87, and between the paste disks and the roller 76 where they have paste or glue applied to their under sides. They then pass across the machine, one upon each side of the web F, the under one, as 37, being turned over so as to bring its paste-side uppermost. The upper strip 38 is thence led above the female die 47 and between it and the die 46, and the other strip, as 37, between the female die 53 and the die 52, passing thence forward to the intermittent feeding device hereinafter described. As the web F, fed forward by the feed C, comes to a stop in proper registry, the rods 50 and 60 are brought together toward one another against the strips, the mechanism being so timed that this shall be done, as is said above, during the periodical stoppages of the web, which, by the intermittent feeder, is brought into proper registry. The spring 44 carries downward the sleeve 41 and punch 46 with the downward motion of the rod 39 to meet the punch 52. The die 46 coöperating with the female die 47 punches a washer out of the upper strip, as 38, and forces it down through the opening in the female die upon the upper surface of the web, the punch 52 at the same time coöperating with the female die 53 to cut a washer from the under strip 37 and force it upward through the opening in the die 53 to the under side of the web F, where both washers are pressed against the web by the punching members 46—52. This of course stops the further movement of the sleeve 41, but, the downward movement of the rod 58 still continuing, the punch 48 is carried still farther downward by the rod 39 and punches a hole through both washers and the intermediate tag strip, forcing the punched-out portion out through the opening 54. Of course the parts are separated by the continuation of the movement of the eccentric, and the operation goes on intermittently for each pause of the web.

The intermittent feeding of the washer strip is accomplished by two rollers 92—93 which are adapted to engage the strip between them and be operated by the mechanism hereinafter described. The roller 93 is mounted upon a shaft 94 which is journaled in a suitable bracket 96 on the upright portion 34 of the frame. Referring to Fig. 7, upon one end of the shaft 94 are mounted a gear 95 and a ratchet-wheel 96 which are secured upon the shaft so as to turn therewith and with the roller 93. 97 indicates a lever which is pivoted upon the shaft 94 and carries at one end a spring-seated dog 98 which is adapted to engage the ratchet-teeth on the ratchet-wheel 96 so as to intermittently rotate the same when the lever 97 is swung back and forth. 99 indicates a link which is pivotally connected at one end with the other end of the lever 97 and at the other end with an eccentric 99ᵃ on shaft 27. It will be obvious that by the reciprocation of the link 99 by the action of the eccentric, the ratchet-wheel 96 and consequently the gear 95 and roller 93 will be intermittently rotated. The other roller 92 (see Figs. 5 and 6) is secured upon a suitable shaft 100 which is journaled in a swinging arm 101 pivotally connected to the upright portion 34 of the frame and is normally forced down upon the other roller by the spring 102 which bears upon a suitable stud on the swinging arm 101 and upon the under side of a bearing 103 projecting from the upright portion 34 of the frame 31, as is best shown in Figs. 2 and 6. 104 indicates a gear secured to the shaft 100 which meshes with the gear 95 connected with the lower roller 92. It will be obvious from the above description that whenever the roller 93 is intermittently rotated, the roller 92 will be also rotated in the opposite direction, and the two rollers 92—93 thus engaging the strips 37—38 between them, the strips will be forwarded intermittently by the intermittent rotation of the rollers.

It frequently happens in the operation of machines of this character that for some reason or other there will be some stoppage or clogging of the machine which will prevent the forward feeding of the web F while the washer-feeding and applying mechanism still continues to feed. In this case, it happens that a number of washers will be successively cut and piled one upon top of the other upon the stopped tag-web, which would cause a clogging of the washer-cutting and punching mechanism very difficult and troublesome to remove. We have therefore devised means which are adapted to automatically stop the forward feeding of the washer strip when the tag-strip for any reason stops in its forward motion. These mechanisms are shown particularly in Figs. 2, 3, 5 and 6. Generally speaking, this mechanism consists of devices by which when more than a given number of washers accumulate upon the tag-strip superposed by reason of its stoppage, the upper feed-roller may be lifted automatically away from the lower roller and the feeding of the washer-strip cease. The operation of the punching mechanism and the washer cutting mechanism might still go on, but the strip being stopped, they would operate through the last opening and no more washers be cut or accumulated. We accomplish this by the following devices. 106 indicates a bellcrank-lever having a long upright arm 107 and a short horizontal arm 108. The bellcrank lever 106 is pivoted to the rod 58 at a point intermediate its ends and below the feed-rollers. 109 indicates a link formed in two parts connected by a turn-buckle 110 which is pivotally connected at one end to the eccentric-box bracket 57 and at its upper end to the outer end of the short arm 108 of the bellcrank-lever 106. It is obvious that as long as the eccentric and the connecting rod 58 are so adjusted that the throw of the eccentric and the throw of the washer-cutting and applying mechanism are the same, the relative positions of the bellcrank-lever and the rod 58 will remain the same. If, however, the rod 58, by the coming together of the washer-applying mechanism, because of any undue amount of material between the moving parts, should cease its downward movement before the downward throw of the eccentric is complete, the spring 61 will yield, as above described, and the eccentric-box being carried still farther downward, will carry with it the link 109, pulling downward the arm 108 of the lever 106 and rocking the upright arm 107 downward away from the rod 58. If, therefore, an undue number of washers should accumulate superposed upon one another by reason of the stoppage of the web, this would prevent the normal movement of the dies 46—52 and therefore of the rod 58, which, as above stated, would cause the upper arm 107 of the bellcrank-lever 106 to be thrown outward away from the rod 58 by the continued throw of the eccentric.

111 indicates a bellcrank-lever pivoted to the top of the bearing 103 and having arms 112—113. The arm 112 extends out in front of the arm 107.

114 indicates a spiral spring one end of which is connected to the arm 112 and the other to a pin 115 carried by the upright portion 34, as is best seen in Fig. 5. The arm 113 has formed upon it a lug 116 upon the inside of the angle of the bellcrank-lever.

117, as is best shown in Fig. 6, indicates a bellcrank-lever pivoted at its lower end on a suitable support on the frame 31 at a point between the rollers 92—93 and the gears 95—104.

The short arm 118 of the bellcrank-lever projects inward so as to bear against the under side of the outer end of the swinging arm 101, and the long arm 119 projects upward through the supporting plate 103 with a spring 120 interposed between it and said supporting plate in a suitable recess therein. The spring 120 tends to urge the arm 117 outward and hence the short arm 118 upward, tending to lift the roller 92 against the action of the spring 102. The action of the spring 120 upon the long arm of the lever 119 is such that when the long arm of the lever is free to move, the spring 120 will urge it outward, lifting the roller 92 away from the roller 93 against the action of the spring 102. The upper arm 119 of the bellcrank-lever 117, however, normally is prevented from moving outward by bearing against the lug 116 on the arm 113 of the lever 111, which is held in engagement by the spring 114 which is made of sufficient strength to normally hold the parts in the position shown in Figs. 5 and 6. When, however, the arm 107 of the bellcrank-lever 106 is moved outward, as above described, the upper end of the arm 107 is thrown outward against the arm 112 of the bellcrank-lever 111, rocking the bellcrank-lever against the action of the spring 114, throwing the lug or latch 116 out of engagement with the arm 107, leaving the spring 120 free to act, as above described, to force the arm 117 outward, the arm 118 upward, lifting the rollers 92 and 93 apart, thereby stopping the feeding action of said rollers.

From the above description, it will be obvious that as long as the machine is running properly and one tag strip and the two washers, one at each side thereof, come between the washer-punching and cutting mechanism, the parts will remain in the normal position shown particularly in Figs. 5 and 6 and the rollers will continue their feeding. If, however, the feeding of the tag-web F stops, so as to superpose more than the desired number of washers upon one another, the washer-cutting and punching mechanism will be prevented from taking their full movement, the eccentric continuing to move against the spring 61 will rock the lever 106, throwing the arm 107 against the arm 112 of the bellcrank-lever 111, causing the lifting of the upper roller, as above described, and the consequent cessation of the washer feed. After any such stoppage, when it is desired to renew the action of the feed, lever 117 is forced back by hand into its normal position, and the latch 116 restored to its normal position to lock the lever in place.

The corner-punching and cutting mechanism E, as is shown in Fig. 1, is carried upon the frame A of the machine near its farther end beyond the washer-applying mechanism. This cutting-mechanism is shown in detail in Figs. 10 to 14, inclusive. Referring to those figures, 125 indicates a support which is removably mounted on the framework A by a suitable bolt 126 and plate 127, and is provided with uprights 128—129. 130 indicates a corner punching mechanism mounted on a bracket 131 on the upright framework 128—129. This mechanism is adapted to punch triangular pieces out of the edge of the tag-web so as to form the corners of the tags, the triangular pieces being punched out between the successive tags. As this triangular punching mechanism may be of any well-known kind and character, and may be operated in any well-known manner, as by suitable levers and eccentrics from the shaft 27 and forms no part of our present invention, we believe it is not necessary to describe it here, as it will be well understood by those skilled in the art of tag-making machinery.

Referring particularly to Figs. 10 to 14, inclusive, 132 indicates a stationary knife or cutting-blade which is removably secured between the uprights 128—129, in any suitable manner, as by screws 133. 134 indicates a swinging frame which is pivotally mounted on a journal 135 on a bracket 136 mounted on the upright part of the frame 128. The swinging frame 134 carries a cutting knife 137 which is removably secured to the frame 134 in any suitable manner, as by screws 138, and is provided with an obtuse V-shaped cutting edge 139. 140 indicates an eccentric which is keyed or otherwise secured to the shaft 27. 141 indicates an eccentric-box or strap carried by the eccentric 140 and provided with a bracket 142 having an interior recess 143. 144 indicates an eccentric-rod whose lower end passes through a suitable opening in the bracket 142 down into the interior of the recess 143, its position in said recess being limited by nuts 145. 146 indicates a spiral spring which surrounds the lower end of the eccentric-rod 144 within the recess 143 whose upper end bears upon the upper surface of the recess and whose lower end bears upon a stop 147 secured on the lower end of the eccentric-rod 144 by a pin 148. The upper end of the eccentric-rod 144 is pivotally connected with the free end of the swinging-frame 134. It will be obvious that when the shaft 27 rotates the eccentric 140, the eccentric-rod 144 will be moved up and down, swinging the swinging frame 134 and causing the knife 137, coöperating with the knife 132, to sever the tag-web passing between the said knife edges. It will also be obvious that the web will be severed either entirely or partly across according to the amount of throw given to the swinging frame 134, by the eccentric-rod 144. This throw is regulated and limited by the following devices: 149 indicates a disk mounted on a shaft 150 journaled in a suitable bracket 151 which is bolted or otherwise secured to the support 125. The disk 149 is provided on its periphery with a number of ratchet-shaped notches 152 spaced a suitable distance apart for the purposes hereinafter described. 153 indicates a ratchet-wheel which is secured upon the shaft 150 against the inner surface of the disk 149. 154 indicates a bellcrank-lever having a long arm 155 and a short arm 156 and pivoted upon the bracket 151 (see Fig. 10). 157 indicates a link whose lower end is pivotally connected with the outer end of the arm 155 and whose upper end is pivotally connected with the eccentric-rod 144 a suitable distance above the bellcrank-lever 154. 158 indicates a spring-seated dog pivoted upon the arm 155 of the bellcrank-lever 154 between its pivotal point and the periphery of the ratchet-wheel 153 and adapted to engage the teeth of said ratchet-wheel. It will be obvious that when the eccentric-rod 144 moves upward to lift the knife, the ratchet-wheel 153 and disk 149 will be rotated in the direction indicated by the arrow in Fig. 10, and when the eccentric-rod 144 descends the dog will slip over the ratchet-teeth, thus intermittently rotating the ratchet-wheel and disk. 159 indicates a journal box secured to the bracket 151 in which is journaled a shaft 160. 161 indicates an arm which is secured to the inner end of the shaft 160 and projects upwardly therefrom, having upon its upper end a stop 162 which is screwed into a suitable threaded opening in the upper end of the arm 161 whereby it may be adjusted on said arm. 163 indicates an arm secured to the outer end of the shaft 160 and projecting over the disk 149. Its lower side is provided with a V-shaped edge 164 of substantially the same shape as the notches 152 in the disk 149. 165 indicates a spring which, held in place at its lower end by a pin 166, bears upon the arm 163. The upper end of the spring 165 bears on the under side of a bracket 167 which is secured to the upright portion 129 of the frame. The spring thus keeps the arm 163 in constant engagement with the disk 149. The parts are so adjusted that when the edge 164 of the arm 163 rests in the notches 152 of the disk 149, the arm 161 is swung slightly forward from the vertical position, as shown in Figs. 10 and 11, out from under the free end of the swinging frame 134. When, however, the arm 163 rests upon the periphery of the disk 149, the shaft 160 is rocked, rocking the arm 161 and the stop 162 toward and under the swinging frame 134, so that when it descends with the action of the eccentric, its downward motion is limited so that the V-shaped knife does not completely sever the paper.

The operation of the above devices is as follows:—Assuming the parts to be in the position shown in Figs. 10 and 11, which is the position in which the cutting-knife is at its lowest position so as to completely sever the tag-web across, the rotation of the eccentric will raise the eccentric-rod 144, lifting the swinging frame 134 and the knife 137. This will cause the arm 163 to be forced upward out of the notches 152 swinging the arm 161 inward under the swinging frame 134. At the next descent of the knife, therefore, it will be prevented by the contact of the stop 162 with the under side of the frame 134 from making a full movement, the further movement of the eccentric compressing the spring 146 which yields suitably therefor. This will continue during the rotation of the disk 149 as long as the arm 163 rides on its periphery between the notches. However, as the next notch is reached, the arm 163 drops into the notch and the knife makes its full movement to completely sever the web.

It will be obvious that by suitably regulating the number of teeth in the ratchet-wheel and the distance between the notches in the disk, the number of partial cuts that may be made between the full cuts may be regulated as may be desired, so that the tags may be severed in gangs containing any desired number of tags.

168 indicates a roller which is journaled between the uprights 128—129 on a shaft 169. The roller 168 carries a wide belt 170 which is adapted to be carried around another roller not shown and affords a traveling table upon which the severed tags are delivered, after being cut as above described.

171 indicates a ratchet-wheel which is secured upon the shaft 169 outside of the upright 128.

172 indicates an arm which is pivotally carried upon the shaft 169 outside of the ratchet-wheel 171 and carries near its outer end a spring-seated dog 173 which is adapted to engage the teeth of the ratchet-wheel. The outer end of the lever 172 is connected by a link 174 with the swinging frame 134 near its inner end, and operates, when the swinging frame is operated to sever the tags, as above described, to rock the arm 172 and, through the medium of the dog 173, to intermittently rotate the roller 168 causing the belt 170 to travel intermittently forward in the direction of the movement of the tag-strip to act as a receiver for the completed and severed tags.

What we claim as our invention and desire to secure by Letters Patent is:—

1. In a tag-making machine, the combination with tag-web-forwarding mechanism, means for supplying washer-strip, washer-cutting and punching mechanism adapted to cut washers from said strip and apply the same to the tag-web, forwarding rollers adapted to engage said washer strip, and mechanism adapted to intermittently rotate said rollers, of mechanism connected with the washer-cutting and punching mechanism and adapted by the accumulation of an excessive number of washers in said washer-cutting mechanism to automatically separate said forwarding rollers.

2. In a tag-making machine, the combination with tag-web-forwarding mechanism, means for supplying washer-strip, and washer-cutting and punching mechanism adapted to cut washers from said strip and apply them to the tag-web, of a roller, mechanism adapted to intermittently rotate the same, a spring-seated roller adapted to engage the washer-strip between it and said first roller, and mechanism connected with the washer-cutting mechanism and adapted by the accumulation of an excessive number of washers in said washer-cutting and applying mechanism to automatically lift said second roller out of engagement with the washer-strip.

3. In a tag-making machine, the combination with intermittently-operating tag-web-forwarding mechanism, washer-cutting mechanism adapted to cut washers from a washer-strip and apply the same to the tag-web, a shaft, an eccentric on said shaft, an eccentric-strap, and a spring-seated eccentric-rod carried on said strap and adapted to operate said washer-cutting and applying mechanism, of a pair of washer-strip-forwarding rollers adapted to engage the washer-strip and forward the same, mechanism for intermittently operating said rollers, and means connected with said eccentric-rod adapted by the accumulation of an excessive number of washers in said washer-cutting mechanism to automatically separate said forwarding-rollers.

4. In a tag-making machine, the combination with intermittently-operating tag-web-forwarding mechanism, washer-cutting mechanism adapted to cut washers from a washer-strip and apply the same to the tag-web, a shaft, an eccentric on said shaft, an eccentric-strap, and a spring-seated eccentric-rod carried on said strap and adapted to operate said washer-cutting and applying mechanism, of a pair of forwarding rollers adapted to engage said washer-strip and forward the same by their rotation, mechanism adapted to intermittently rotate said forwarding-rollers, an arm adapted by its movement to separate said forwarding-rollers, and means connected with said eccentric-rod and adapted by the accumulation of an excessive number of washers in said washer-cutting mechanism to operate said arm to separate said forwarding-rollers.

5. In a tag-making machine, the combination with intermittently-operating tag-web-forwarding mechanism, washer-cutting mechanism adapted to cut washers from a washer-strip and apply the same to the tag-web, a shaft, an eccentric on said shaft, an eccentric-strap, and a spring-seated eccentric-rod carried on said strap and adapted to operate said washer-cutting and applying mechanism, of a roller, means for intermittently rotating said roller, a second spring-seated roller adapted normally to bear upon said first roller and engage the washer-strip between them, a bellcrank-lever bearing on said second roller and adapted by its movement to lift the same out of contact with said first roller, a bellcrank-lever pivoted upon said eccentric-rod, a link connecting one arm of said second bellcrank-lever with said eccentric-strap, and a third bellcrank-lever having one arm adapted to engage said first bellcrank-lever and the other arm adapted to be engaged by the other arm of said second bellcrank-lever whereby by the accumulation of an excessive number of washers in said washer-cutting mechanism said bellcrank-levers will be operated to lift said second roller.

6. The combination with washer-strip-forwarding and washer-cutting and applying mechanism, of a glue-pot, a slotted cover on said glue-pot having brackets, a glue-disk mounted in said brackets entering said slot in said cover, a spring-seated wheel adapted to engage a washer-strip between it and said first wheel and mounted in said brackets, and a plate mounted in said glue-pot and adjustable toward and away from said glue-disk whereby the amount of glue taken up by said glue-disk may be regulated.

7. The combination with washer-strip-forwarding and washer-cutting and applying mechanism, of a glue-pot, a slotted cover on said glue-pot having brackets, a glue-disk mounted in said brackets entering said slot in said cover, a spring-seated wheel adapted to engage a washer-strip between it and said first wheel and mounted in said brackets, and a plate mounted upon said glue-pot and having a recessed end adapted to straddle said glue-disk and adjustable toward and away from said glue-disk whereby the amount of glue taken up by said glue-disk may be regulated.

8. In a tag-making machine, the combination with an intermittently-operated tag-web-forwarding mechanism, a fixed cutter, a movable cutter having a V-shaped cutting edge, mechanism for operating said movable cutter, a disk having a plurality of notches in its periphery, and means for intermittently rotating said disk, of a rock-shaft journaled near said disk, an arm on said rock-shaft spring-pressed against said disk, and a second arm on said rock-shaft adapted when said first arm drops into one of the notches on said disk to be swung back under said movable cutter and limit its downward motion and adapted when said first arm passes out of one of said notches to swing out from the path of said movable cutter.

9. In a tag-making machine, the combination with an intermittently-operated tag-web-forwarding mechanism, a fixed cutter, a swinging frame provided with a V-shaped cutting blade, an operating shaft, an eccentric on said operating shaft, an eccentric-strap on said eccentric, a bracket on said eccentric-strap, an eccentric-rod spring-seated at one end in said bracket and pivotally connected at the other end with said swinging frame, a disk having a plurality of notches in its periphery, and means for intermittently rotating said disk, of a rock-shaft journaled near said disk, an arm on said rock-shaft spring-pressed against said disk, and a second arm on said rock-shaft adapted when said first arm drops into one of the notches on said disk to be swung back under said swinging frame and limit its downward motion and adapted when said first arm passes out of one of said notches to swing out from the path of said swinging frame.

10. In combination, a fixed cutter, a movable cutter having an inclined cutting edge, mechanism for operating said movable cutter, a support, an oscillating arm pivoted on said support and adapted to be swung into the path of said movable cutter and thereby limit its motion, and mechanism operated by said movable-cutter-operating-mechanism to intermittently, at predetermined intervals, swing said oscillating arm into and out of the path of said movable cutter.

11. In combination, a fixed cutter, a movable cutter having its edge inclined relatively to the cutting edge of said fixed cutter, mechanism for operating said movable cutter, a support, an oscillating arm pivoted near one end on said support and adapted to have its other end swung into the path of said movable cutter, an adjustable stop carried by said oscillating arm and adapted when said oscillating arm is swung into the path of said movable cutter to limit the motion of the same, and mechanism operated by said movable-cutter-operating-mechanism adapted to intermittently, at predetermined intervals, swing said oscillating arm into and out of the path of said movable cutter.

12. In a tag machine, the combination with intermittent tag-web-forwarding mechanism, a fixed cutter, a movable cutter in operative relation therewith, a stop adapted to limit the movement of said movable cutter, and means for intermittently moving said stop into and out of the path of said movable cutter, of a shaft, means for driving the same, an eccentric on said shaft, an eccentric-strap on said eccentric, a bracket on said eccentric-strap, and a connecting rod spring-seated at one end in said bracket and pivotally connected at its other end to said movable cutter.

13. In a tag machine, the combination with intermittently acting tag-web-forwarding mechanism, and washer-strip-forwarding mechanism adapted to feed the washer-strip to said tag-web, of opposed reciprocatory punch members adapted to punch washers from said washer strip and apply them to said tag-web, a shaft, means for driving said shaft, an eccentric on said shaft, an eccentric strap carried by said eccentric, a bracket on said eccentric strap, a connecting rod spring-seated at one end in said bracket and connected at its other end to one of said opposed reciprocatory punch members, and connections between said connecting rod and the other of said opposed reciprocatory punch members.

STROWBRIDGE B. SEATON.
ROY G. TRAVIS.

Witnesses:
R. M. KENNING,
A. SCHULDT.